United States Patent
Amann et al.

(10) Patent No.: US 6,560,201 B1
(45) Date of Patent: May 6, 2003

(54) METHOD OF RE-SYNCHRONIZING A GROUP OF B CHANNELS IN AN ISDN NETWORK

(75) Inventors: Eberhard Amann, Rottenburg (DE); Helga Hermann, Leinfelden-Echterdingen (DE); Juergen Saalmueller, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/301,987

(22) Filed: Apr. 29, 1999

(30) Foreign Application Priority Data

Apr. 12, 1999 (DE) .......................................... 991 07 070

(51) Int. Cl.$^7$ ................................................ G06F 11/00
(52) U.S. Cl. ...................... 370/242; 370/394; 370/524; 370/904
(58) Field of Search ................................ 370/242, 235, 370/244, 252, 253, 503, 522, 524, 251, 904, 349, 468, 389, 511, 513, 512, 514, 535, 536

(56) References Cited

U.S. PATENT DOCUMENTS

| | | | | | |
|---|---|---|---|---|---|
| 5,483,530 | A | * | 1/1996 | Davis et al. ................. | 370/465 |
| 5,771,229 | A | * | 6/1998 | Gavrilovich ................. | 370/342 |
| 5,856,999 | A | * | 1/1999 | Robinson et al. ........... | 375/221 |
| 5,910,827 | A | * | 6/1999 | Kwan et al. ............. | 348/845.1 |
| 5,936,941 | A | * | 8/1999 | Kondo et al. ................ | 370/242 |
| 6,178,185 | B1 | * | 1/2001 | Marks ......................... | 370/514 |

* cited by examiner

*Primary Examiner*—Dang Ton
*Assistant Examiner*—Tri H. Phan
(74) *Attorney, Agent, or Firm*—John David Flynn

(57) ABSTRACT

Method and apparatus are provided for re-synchronizing a group of B channels in an ISDN network using the BONDING Mode 1 specification. Re-synchronization is achieved without the need to first disconnect the affected group of B channels from the network. Thus, the reliability of the bonded channels is improved while maintaining a simpler architecture than those associated with BONDING Modes 2 and 3. The solution offers improved channel reliability, improved network performance and reduced network load when channel re-synchronization becomes necessary.

4 Claims, No Drawings

METHOD OF RE-SYNCHRONIZING A GROUP OF B CHANNELS IN AN ISDN NETWORK

RELATED APPLICATIONS

The invention described here is related to those described in two applications filed on a common date herewith and held in common by the assignee of this invention. Those applications are identified as:

Method and Apparatus for Adjustment of Time Delays in Synchronous Clocked Bus Systems, Ser. No. 09/301,821, filed Apr. 29, 1999; and Method and System for Re-synchronizing Channels Supporting an Inverse Multiplexing Function, Ser. No. 09/301,837, filed Apr. 12, 1999.

TECHNICAL FIELD

This invention relates to an ISDN network interface on networking equipment. More particularly, the invention applies to the re-synchronization of a group of B Channels in an ISDN network. Still more specifically, this invention relates to such a method and apparatus that reissues the sequence of initial synchronization as described in the BONDING™ (Trademark of the Bonding Consortium) Mode 1 specification.

BACKGROUND ART

Backbones for local area network (LAN) connections within large companies, as well as the connections between those companies (World Wide Web—www), are typically operated using proprietary or leased glass fiber networks employing an ATM protocol. Often the need for additional bandwidth arises in these networks, either because of increased network traffic demands or to provide backup bandwidth for dropped connections. To supply this additional bandwidth, several digital telephone channels (Bearer channels) of the public switched network are bundled together to provide an aggregate channel of increased bandwidth.

For example, a bandwidth of 64 Kbit/s can be achieved using one Bearer channel (B channel). Typically, 24 (T1 standard) or 30 (E1 standard) of these channels are contained in a primary multiplexed line, thus providing a raw data rate of up to 2 Mbit/s when fully utilized.

It is, however, problematic that network suppliers can give no warranty that each of these B channels are operated synchronously to one another when telephone channels of the public switch network are used to form the primary multiplexed line. Certainly the entire telephone network is operated by a synchronous clock, however, differences in transmit time between the respective bundled channels can occur. Because the different data packets making up a data package (ATM frame) will pass through different paths in the network on their way from sender to receiver, the contents of the data packages (ATM frames) which are multiplexed and transmitted in these channels may not reach the addressee in their original form. In addition, there will be no warranty that the individual channels will follow a certain sequence (channel shuffling) when arriving at the addressee. This problem is also known from the field of picture telephony.

The inverse multiplexing function converts a wide-band communication on a high speed link into a group of combined switched channels. For example, this function can be used to convey 2 Mbits bandwidth over ISDN B channels of 56 or 64 Kbit/s. Other examples are the European primary ISDN (Integrated Services Digital Network) which provides 30 B channels for data transfer and one channel for call control (D channel) and basic rate ISDN which utilizes two B channels for data transfer and one D channel for control.

A challenge associated with inverse multiplexing is to be able to re-synchronize the bundled channels such that the high speed link can be rebuilt on the remote (receiving) side of an established link between two peer stations connected to one another through the ISDN network. This challenge exists for data transfer in both directions, as the established link can be used to support full duplex communication. Because the path between peers in one direction may have different characteristics as compared to the path in the opposite direction, the inverse multiplexing function must be performed symmetrically at each receiving station.

The BONDING™ (Bandwidth On Demand Interoperability Group) specifications written by the BONDING consortium on Sep. 1, 1992 (and later releases) offer some guidance to solving this problem. These specifications define a frame structure and procedures for establishing a wide-band communication link by combining multiple switched 56 or 64 Kbit/s channels that connect network nodes over a switched digital network (e.g. public switched telephone network, private network, etc.). At the transmitting end of the link, user data is placed in repeated frames that are carried over multiple, independent B channels. At the receiving end of the link, all channels are phase aligned and synchronized by an apparatus known as an Inverse Multiplex Unit (IMU), such that the original wide-band communication can be reassembled. The skilled reader will appreciate that this invention is not restricted to the use of the IMU described herein, any type of apparatus can be used which is able to cancel the varying channel delays present at the receiver side of the network.

Because the channels used for the wide-band connection are routed through the network independently of each other, the data in each channel may be individually delayed relative to the data in other channels. Overall transit delay for the end-to-end connection is equal to the longest transit delay between each of the individual channels plus a constant delay due to the data reordering function performed by the receiving IMU. To allow for the correct realignment of the data at the receive end, the BONDING specification calls for the transmission of a training sequence which is to be sent in advance of a group of several channels being bonded to form a high speed link. This training sequence is made up of a special framing pattern that is exchanged between each of the locations participating in the connection. The analysis of this pattern, when received, allows for the exact calculation of delays introduced by the switched network. Once aligned, data transfer is continually monitored throughout a transmission for failures such as channel disconnection, phase slip or high error rate. Various fault isolation and recovery procedures are defined in the specification to address these failure modes.

The BONDING specification describes four modes of operation:

BONDING Mode 0 calls for initial parameter negotiation and directory number exchange to take place over a master channel before data transmission begins. No delay equalization is specified under this mode. Thus, the mode is useful when the calling endpoint requires directory numbers and when delay equalization is performed by some other means (e.g., an attached video codec).

BONDING Mode 1 supports user data rates that are multiples of a bearer rate. It provides a user data rate equal to the full aggregate bandwidth of the bearer channels, but does not provide for in-band monitoring of transmission quality. This mode also supports delay equalization by providing for the sending of an initial set of frames, or so called training sequence, to synchronize (phase align) the sending of multiplexed data over the various bearer channels. Error conditions on one or more the channels that disturb overall system synchronization are not automatically recognized.

BONDING Modes 2 and 3 are each based upon Mode 1, however, these modes support transmission quality monitoring by using data transfer frames that include bits dedicated to storing transmission control information. This information can be analyzed at the receive side of the network to determine if transmission failures have occurred and to drive appropriate fault recovery routines. The ability to monitor the transmission quality does not come without a price, however, as that portion of the bandwidth being used for the transport of control information reduces the overall bandwidth available for data transmission. For Mode 2 the effective B channel rate is reduced by $1/64^{th}$. Mode 3 requires one additional B channel to provide for the control information overhead.

Because of its simplicity and full bandwidth support, BONDING Mode 1 has become the most popular mode employed to bond channels for high speed data transmission. Typically, the quality monitoring and failure recovery routines, unsupported by Mode 1, are performed at some upper protocol layer of the application using the BONDING function. However, challenges remain in performing the above mentioned training sequence and subsequent delay compensation at high data rates (sustained 2 Mbit/s) at the receiver. This challenge is augmented by the need to synchronize the data path in both directions in order to support full duplex mode data transmission. Using present day techniques, the training sequence must be performed each time a group of channels is bonded (i.e. before each data transfer can begin), resulting in a costly solution that requires special ASICs or a number of signal processors in order to implement the function.

One of the aforementioned related applications proposes an extension to BONDING Mode 1 that facilitates the re-synchronization of a group of channels without the need for first disconnecting that group of channels from the network. The method and apparatus described call for assigning the roles of initiator and completer to a respective network node connected by a group of bonded channels. One side, acting as initiator, informs the opposite side, acting as completer, to request the re-synchronization of the selected group of bonded channels by means of a NOTIFY message sent over the D-channel of the connection. This NOTIFY message contains the call reference of the group's master channel, thus allowing the completer side to identify the selected group of bonded channels to be re-synchronized. Upon reception of the NOTIFY message sent by the initiator, the completer then requests its local IMU to re-synchronize the selected group of bonded channels and informs the initiator of such action by again sending a NOTIFY message over the D-channel having the call reference of the group master channel connection. Finally, upon reception of the acknowledging NOTIFY message sent by the completer side, the initiator side requests its local IMU to re-synchronize the selected group of bonded channels.

A deficiency associated with the use of BONDING Mode 1 is its lack of checking routines available for validating the re-synchronization of the received data stream. A problem can occur in standard Mode 1 implementations when the normal failure recovery procedures call for the intentional disconnection of the physical links in order to re-establish the group.

It is therefore one purpose of this invention to provide an extension to the BONDING Mode 1 specification that allows for a simple, reliable synchronization procedure, thereby reducing the time and network load required to achieve re-synchronization of the bonded channels.

It is another purpose of this invention to provide a solution that facilitates the use of the simpler IMU architectures associated with BONDING Mode 1 as compared to the more complex IMU architectures needed to support BONDING Modes 2 and 3.

SUMMARY OF THE INVENTION

An extension of the BONDING Mode 1 specification is proposed which allows an application implementing the BONDING function to re-synchronize a group of B channels when a transmission failure is detected. The method and apparatus described herein supports the simultaneous re-synchronization of multiple groups of bonded channels.

Re-synchronization is accomplished by reissuing the sequence of initial synchronization as described in the BONDING Mode 1 specification, without the need to first disconnect the group of bonded B channels from the network. This solution offers the advantage of providing an improvement in the reliability of transmissions sent over the bonded channels, while maintaining the ability to use the simpler IMU architecture used with BONDING Mode 1 as compared to the more complex IMU architectures associated with BONDING Modes 2 and 3. The solution also provides the advantage of significantly reducing the time and network load required for re-synchronizing the bonded channels.

More particularly, when a link failure is detected by an upper layer of an application implementing the BONDING function, (e.g. layer 3 of the Open Systems Interconnect [OSI] model), a signal is sent by that upper protocol layer to its adapter's IMU function requesting re-synchronization of the failed link. Re-synchronization is performed independently on both sides of the link using the training sequence defined in the BONDING Mode 1 specification without the need to first disconnect the bonded channels from the network.

DETAILED DESCRIPTION OF THE PREFERRED EMBODIMENT

As mentioned above, a deficiency associated with the use of BONDING Mode 1 is its lack of checking routines available for validating the re-synchronization of the received data stream. While BONDING Modes 2 and 3 offer this capability, added complexity and the loss of bandwidth make these modes less attractive to implement. An equivalent monitoring of channel synchronization can be achieved using Mode 1 if an upper layer of the data transport protocol is used to survey the synchronization of transmitted data. The high speed network protocols typically used today (e.g. ATM) provide such function on the transport layer. The data integrity check performed by this layer can be used to indicate that a failure in the reordering process performed by an IMU on the receive side of a network connection has occurred. This in turn can be used to initiate a new training sequence (or re-synchronization process) on the failed link.

A problem associated with the standard implementation of Mode 1 occurs when, following the detection of a link failure, the normal recovery procedures disconnect the physical links in order to re-establish the group. This time consuming procedure generates additional load on the switched network, possibly causing time-out conditions to occur in the higher layers of the data transport protocol or perhaps even worse, the possible disconnection of an application layer entirely.

Because the loss of synchronization does not alter the actual setup of a group of channels (e.g. the number of channels required to achieved the desired bandwidth), there is no need to first drop a connection prior to beginning re-synchronization. Instead, only the training phase needs to be re-initiated such that the delays between the channels of the group are re-calculated and compensated for. Re-synchronization alone can be accomplished in a much shorter amount of time than requiring a disconnect and reconnect to occur prior to beginning the synchronization procedure. To realize this performance improvement, a new command is introduced into the BONDING specification called 'Try to resynch' which, as described below, is used re-synchronize a group of channels without the need to first disconnect the channels from the network.

The following describes the protocol sequence executed in accordance with a preferred embodiment of the invention. The execution of this protocol sequence is described in the context of a scenario in which a loss in synchronization has occurred in a group of B channels, possibly the result of a phase slip, after training has been completed for the link and data transfer initiated.

The scenario begins with the detection of a link failure by an upper layer of a protocol implementing the BONDING function. Following detection of the failure, the upper layer sends a 'Try to re-synch' request to its corresponding IMU state machine which then processes the request. This first IMU (Station 1) then switches from user data mode to re-synchronization mode by sending synchronization patterns over the failed link. Confirmation of the IMU's entry into this state is communicated to the upper protocol layer using the 'Try to re-synch confirm' signal.

A second IMU (Station 2) receives a 'Try to re-synch' request from its upper protocol layer, asynchronously to the notification of the first IMU, by a process as described in one of the aforementioned related applications. This IMU on Station 2 also begins to send out synchronization patterns over all channels of the failed link, again informing its upper layer protocol of the change from data mode to re-synchronization mode via the 'Try to re-synch confirm' signal. Following successful completion of the re-training sequence, the delays for each of the channels in the link are recalculated and the corresponding delay tables are updated. Finally, the 'Isynch_ind' signal is sent by each IMU to its corresponding upper protocol layer indicating that synchronization for the link has been completed and that the exchange of user data can once again continue.

The following sequence depicts the above-described scenario wherein link synchronization is accomplished without the need to first disconnect the affected channels from the network:

| Initiator (Station 1) | Completer (Station 2) |
|---|---|
| Try to re-synch_req ----------------------> | Try to re-synch_req <---------------------- |
| Try to re-synch_conf <---------------------- | Try_to_re-synch_conf ----------------------> |
| Synchronize all channels Calculate delays | |
| Isynch_ind <----------- | Isynch_ind -----------> |

In contrast to this sequence, the protocol sequence resulting from the same scenario occurring in a network implementing the standard BONDING protocol is described below.

Again, the scenario begins with the detection of a link failure by an upper layer of a protocol implementing the BONDING function. Following detection of the failure, the upper layer sends an 'abort' request to its corresponding IMU state machine which then processes the request. This first IMU (Station 1) then releases the failed group from user data mode operation using the 'abort_conf' and 'abort_ind' commands. The call control function (which handles link establishment via the D channel in the group) initiates the link release of all channels of that group using the standard disconnect procedure. Station 2 then receives the indication that all channels of the failed group are disconnected, and in turn resolves the group using the 'abort_conf' and 'abort_ind' commands.

Following successful disconnection of the link, Station 1 then begins a standard connect procedure by sending a connect request on the first channel of the new group. Following this, parameter negotiation takes place with Station 2 (negotiating the number of channels for instance) after which each station accepts the negotiated parameters. Both stations continue to establish the additional links for that group by sending connect requests to the network and receiving corresponding confirmations, (in the example shown below, an additional four channels are allocated to the group), until the desired aggregate bandwidth is achieved.

Up to this point, the overhead associated with the disconnect/reconnect process is eliminated by the invention of the preferred embodiment. Only the steps of re-synchronization and delay calculation are shared by the two methods following detection of a link failure. In addition, the current BONDING implementation may require the additional step of reordering the channels at the receive side of the network due to the establishment of a new link. As stated above, the additional overhead required to disconnect and re-establish all of the channels of the group is very time consuming and generates additional network load.

For purposes of illustration, the above-described scenario is depicted below in a network implementing the basic BONDING protocol (i.e. disconnect, reconnect, and re-synchronization):

| Initiator (Station 1) | Completer (Station 2) |
|---|---|
| abort_req ---------> | abort_req <--------- |
| abort_conf <--------- | abort_conf ---------> |

-continued

| Initiator (Station 1) | Completer (Station 2) |
|---|---|
| abort_ind | abort_ind |
| <--------- | ---------> |
| connect_req,out,first | connect_req,in,first |
| --------------------> | <-------------------- |
| Negotiate call parameters | |
| ---------------------------> | |
| Accept call parameters | |
| <--------------------------- | |
| init_ind | init_ind |
| <--------- | ---------> |
| connect_req,out,next | connect_req,in,next |
| --------------------> | <------------------- |
| connect_conf | connect_conf |
| <----------- | -----------> |
| connect_req,out,next | connect_req,in,next |
| --------------------> | <------------------- |
| connect_conf | connect_conf |
| <----------- | -----------> |
| connect_req,out,next | connect_req,in,next |
| --------------------> | <------------------- |
| connect_conf | connect_conf |
| <----------- | -----------> |
| connect_req,out,next | connect_req,in,next |
| --------------------> | <------------------- |
| connect_conf | connect_conf |
| <----------- | -----------> |
| Synchronize all channels | |
| Calculate delays | |
| Wait for reorder information | |
| Isynch_ind | Isynch_ind |
| <--------- | ---------> |

Thus, the above described improved method for the implementation of BONDING Mode 1 achieves increased reliability of the bonded channels, improved performance and reduced network load requirements, while maintaining the simpler IMU architecture used with Mode 1 as compared to the more complex IMU architectures associated with BONDING Modes 2 and 3. By using this method, re-synchronization can be achieved in a group of bonded channels without the need to first disconnect the respective group of B channels from the network.

What is claimed is:

1. A method comprising:

connecting a first network device to a second network via a group of bearer channels bonded together using a BONDING mode 1 protocol to form a high speed link for the transfer of user data;

synchronizing user data received over the link from each of the group of bearer channels using delays obtained from sending a training sequence over the link;

monitoring the synchronized user data using an upper level protocol layer, wherein the upper level protocol layer is used to detect continuous failures of data flow; and responding to detection of a failure of data flow by maintaining the connection thereof through the group of bearer channels and by sending the training sequence over the link and subsequently synchronizing the user data received over the link from each of the group of bearer channels using delays obtained from the subsequent sending of the training sequence.

2. A method according to claim 1 wherein the step of responding to the detection of a failure of data flow is simultaneously accomplished for a plurality of groups of bearer channels.

3. A method according to claim 1 wherein the devices include initiator and completer devices on two sides of the channel and further wherein synchronization is initiated on both sides of the channels.

4. A method according to claim 1 wherein the upper level protocol layer is related to control of user data transport.

* * * * *